(12) United States Patent
Garay (10) Patent No.: US 12,260,355 B2
(45) Date of Patent: Mar. 25, 2025

(54) DIMENSIONING A NEW PRODUCTION PLANT FOR PRODUCTION OF PACKAGED DAIRY PRODUCTS BY SIMULATION

(71) Applicant: Tetra Laval Holdings & Finance S.A., Pully (CH)

(72) Inventor: Ruben Garay, Veberöd (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 886 days.

(21) Appl. No.: 17/058,844

(22) PCT Filed: May 29, 2019

(86) PCT No.: PCT/EP2019/064122
§ 371 (c)(1),
(2) Date: Nov. 25, 2020

(87) PCT Pub. No.: WO2019/229203
PCT Pub. Date: Dec. 5, 2019

(65) Prior Publication Data
US 2021/0209268 A1    Jul. 8, 2021

(30) Foreign Application Priority Data
May 31, 2018 (EP) .................................... 18175287

(51) Int. Cl.
*G06Q 10/0631* (2023.01)
*G06Q 10/067* (2023.01)
(52) U.S. Cl.
CPC ....... *G06Q 10/0631* (2013.01); *G06Q 10/067* (2013.01)
(58) Field of Classification Search
CPC ........ G06Q 10/00; G06Q 10/04; G06Q 10/06; G06Q 10/067; G06Q 10/0631
See application file for complete search history.

(56) References Cited

U.S. PATENT DOCUMENTS 6,889,106 B2 * 5/2005 Wei .................... G06Q 10/0631
700/100
7,043,414 B2 * 5/2006 Brown ................... G06Q 50/04
703/12
(Continued)

FOREIGN PATENT DOCUMENTS

CN          102231068 A     11/2011
DE     102006004413 A1      8/2007
(Continued)

OTHER PUBLICATIONS

Kuriyan, K., Reklaitis, G. & Joglekar, G. "Multiproduct Plant Scheduling Studies Using Boss" Ind. Engineering Chemical Research, vol. 26, pp. 1551-1558 (1987) available at <https://pubs.acs.org/doi/pdf/10.1021/ie00068a010> (Year: 1987).*

(Continued)

*Primary Examiner* — Jay Hann
(74) *Attorney, Agent, or Firm* — Knobbe, Martens, Olson & Bear, LLP (57) ABSTRACT

A computer device implements a method of dimensioning a new plant for production of packaged dairy products by simulation. The method operates by obtaining a production target for dairy products to be produced and packaged in the production plant, by obtaining recipes for production of the packaged dairy products, where each recipe defines ingredients and recipe activities, and by obtaining production unit data that associates each of a plurality selectable production units with one or more unit activities and a production capacity. The method further performs the simulation by generating, as a function of the recipes and the production unit data, combinations of selectable production units that are connected for fluid communication and operable to perform the recipe activities of the respective recipe to achieve the production target, and evaluating the combina- (Continued)

tions for selection of at least one combination representing a plant configuration.

22 Claims, 7 Drawing Sheets

(56) References Cited

U.S. PATENT DOCUMENTS

| | | | | |
|---|---|---|---|---|
| 7,702,411 | B2* | 4/2010 | Bagchi | G06Q 10/06312 |
| | | | | 700/100 |
| 7,908,127 | B2* | 3/2011 | Weigang | G05B 19/41865 |
| | | | | 703/6 |
| 9,729,639 | B2* | 8/2017 | Sustaeta | G06Q 10/06 |
| 11,631,045 | B2 | 4/2023 | Garay | |
| 2003/0220828 | A1 | 11/2003 | Hwang | |
| 2011/0130857 | A1 | 6/2011 | Budiman | |
| 2012/0041798 | A1* | 2/2012 | Prescher | G06Q 10/0633 |
| | | | | 705/7.27 |
| 2012/0083914 | A1 | 4/2012 | Kocis et al. | |
| 2014/0116341 | A1 | 5/2014 | Kopic et al. | |
| 2016/0259867 | A1* | 9/2016 | Braks | G05B 19/4188 |
| 2018/0293288 | A1* | 10/2018 | Noetzelmann | G06F 16/258 |

FOREIGN PATENT DOCUMENTS

| | | |
|---|---|---|
| EP | 2507672 | 1/2016 |
| WO | WO 00/28451 A2 | 5/2000 |

OTHER PUBLICATIONS

Jovan, V. "The Specifics of Production Scheduling in Process Industries" IEEE ICIT'02, pp. 1049-1054 (2002) (Year: 2002).*

Petrides, D. & Siletti, C. "The Role of Process Simulation and Scheduling Tools in the Development and Manufacturing of Biopharmaceuticals" Proceedings of 2004 Winter Simulation Conf. (2004) (Year: 2004).*

Alnahhal, M., et al. "In-Plant Milk Run Decision Problems" IEEE Int'l Conf. on Logistics Operations Management (2014) available from <https://ieeexplore.ieee.org/abstract/document/6887421> (Year: 2014).*

Fernandez-Ledesma, J. "Optimization model for the dairy sector" IEEE Proceedings of 2015 Int'l Conf. on Industrial Engineering & Operations Management (2015) (Year: 2015).*

Extended European Search Report issued in Application No. 18175287.4 dated Aug. 21, 2018.

International Search Report and Written Opinion issued in Application No. PCT/EP2019/064122 dated Jun. 19, 2019.

Deshmukh et al., "Computer Application in Dairy Industry," Oriental Journal of Computer Science & Technology, ISSN: 0974-6471, Apr. 2015, vol. 8, No. 1, pp. 24-34.

Gunasekaran, S., "Computerized Automation Controls in Dairy Processing," University of Wisconsin-Madison, 1997, pp. 407-449.

* cited by examiner

DIMENSIONING A NEW PRODUCTION PLANT FOR PRODUCTION OF PACKAGED DAIRY PRODUCTS BY SIMULATION

TECHNICAL FIELD

The invention generally relates to production of dairy products, and in particular to a simulation tool for dimensioning a new production plant for production of packaged dairy products.

BACKGROUND ART

The dimensioning of a new plant for production of packaged dairy products is a complex task that conventionally relies on heuristics, intuition and experience of a team of process engineers. As used herein, dimensioning denotes a process of determining the production equipment to be included in the new plant and the flow of material within the plant to achieve a production target. Generally, plants for production and packaging of dairy products need to be capable of producing a large number of different types of packaged dairy products, both with respect to the type of packages and the type of dairy products, and the types and/or volumes of packaged dairy products to be produced may differ over time. The plant may be designed with multiple production lines, and a large number of process constraints may exist due to varied capabilities of the production lines and the processing requirements. Some products may be produced on more than one production line and some processes may require sharing of production equipment. Some products may have precedence constraints, and products that have similar production conditions may be scheduled for production consecutively. Further, the production of packaged dairy products may involve both batch production and continuous production, which makes dimensioning even more challenging.

Further, when dimensioning a new plant for production of packaged dairy products, it may be desirable to account for different scenarios of future production targets, which makes dimensioning even more complex and labor intensive. The outcome of the dimensioning will typically differ for the same input data depending on the experience of the team of process engineers. Given the economic consequences of a potential undersizing of the production plant, there is a general tendency to instead oversize the production plant, resulting in an overestimation of the required investment cost and ultimately an unnecessary expenditure for building the new plant.

Also, there are factors relevant for the production that are not taken into account by the process engineer when dimensioning a new plant.

SUMMARY

It is an object of the invention to at least partly overcome one or more limitations of the prior art.

One such object is to improve and/or facilitate dimensioning of a plant for production of packaged dairy products.

One or more of these objects, as well as further objects that may appear from the description below, are at least partly achieved by a method, a computer-readable medium and a device according to the independent claims, embodiments thereof being defined by the dependent claims.

A first aspect of the invention is a computer-implemented method of dimensioning a plant for production of packaged dairy products by simulation. The method comprises: obtaining target production data for a plurality of dairy products to be produced and packaged in the production plant to form the packaged dairy products; obtaining recipes for production of the plurality of dairy products, wherein each recipe defines a set of ingredients and sequence of recipe activities for producing a respective dairy product from the set of ingredients; obtaining production unit data for selectable production units, the production unit data associating each selectable production unit with one or more unit activities and a production capacity; and simulating the production of the packaged dairy products in the plant to determine at least one combination of selectable production units that achieve the target production data. The simulating comprises: generating, as a function of the recipes and the production unit data, combinations of selectable production units that are connected for fluid communication and operable to perform the sequence of recipe activities of the respective recipe to achieve the target production data; evaluating the combinations for selection of said at least one combination; and outputting said at least one combination.

A second aspect of the invention is a computer-readable medium comprising computer instructions which, when executed by a processing device, cause the processing device to perform the method of the first aspects or any of its embodiments.

A third aspect of the invention is a device for dimensioning a plant for production of packaged dairy products, the device being configured to perform the method of the first aspect of any of its embodiments.

Still other objectives, as well as features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, the term "and/or" includes any and all combinations of one or more of the associated listed items. As used herein, a "set" of items is intended to imply a provision of one or more items. Thus, a "set of ingredients" may designate a single ingredient or multiple ingredients. Likewise, a "set of production units" may designate a single production unit or multiple production units. As used herein, "dairy product" refers to a food product that has produced from a substance that contains milk from mammals, primarily but not exclusively cattle, or milk from plant sources. The substance may be made from fresh milk and/or milk powder.

Well-known functions or constructions may not be described in detail for brevity and/or clarity. Unless otherwise defined, all terms (including technical and scientific terms) used herein have the same meaning as commonly understood by one of ordinary skill in the art to which this invention belongs.

Like reference signs refer to like elements throughout.

Figure 1:
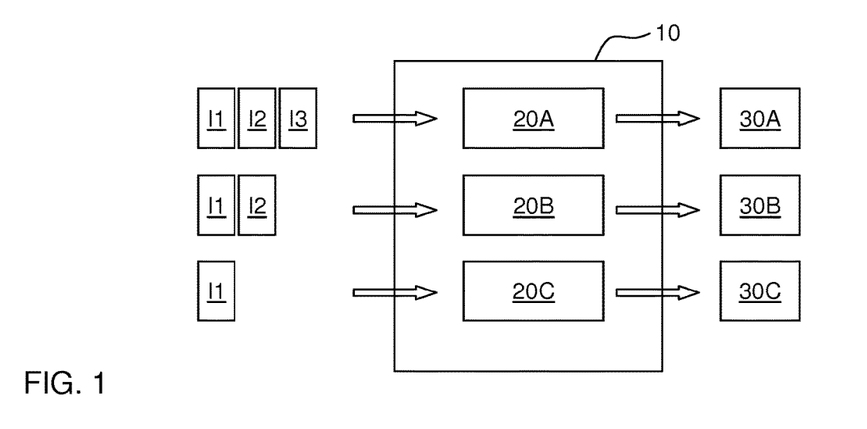
FIG. 1 schematically illustrates processes for producing packaged dairy products from sets of ingredients in a production plant.

FIG. 1 is a schematic overview of a production plant 10 which is arranged to produce three different packaged dairy products 30A, 30B, 30C from ingredients I1, I2, I3, by use of three production processes 20A, 20B, 20C that are performed by the production equipment in the plant 10. The production processes 20A, 20B, 20C and the ingredients I1, I2, I3 are defined by recipes for the respective dairy product 30A-30C. To maximize production throughput, it would be desirable to perform the processes 20A-20C in parallel by use of different production equipment. However, it is generally not possible, for reasons of economy, to dimension a plant for parallel production of all possible types of packaged dairy products. Thus, the processes 20A-20C generally have to at least partly share the production equipment in the plant. The task of allocating activities of the respective process 20A-20C to the production equipment in the plant 10 is denoted time scheduling.

Figure 2:
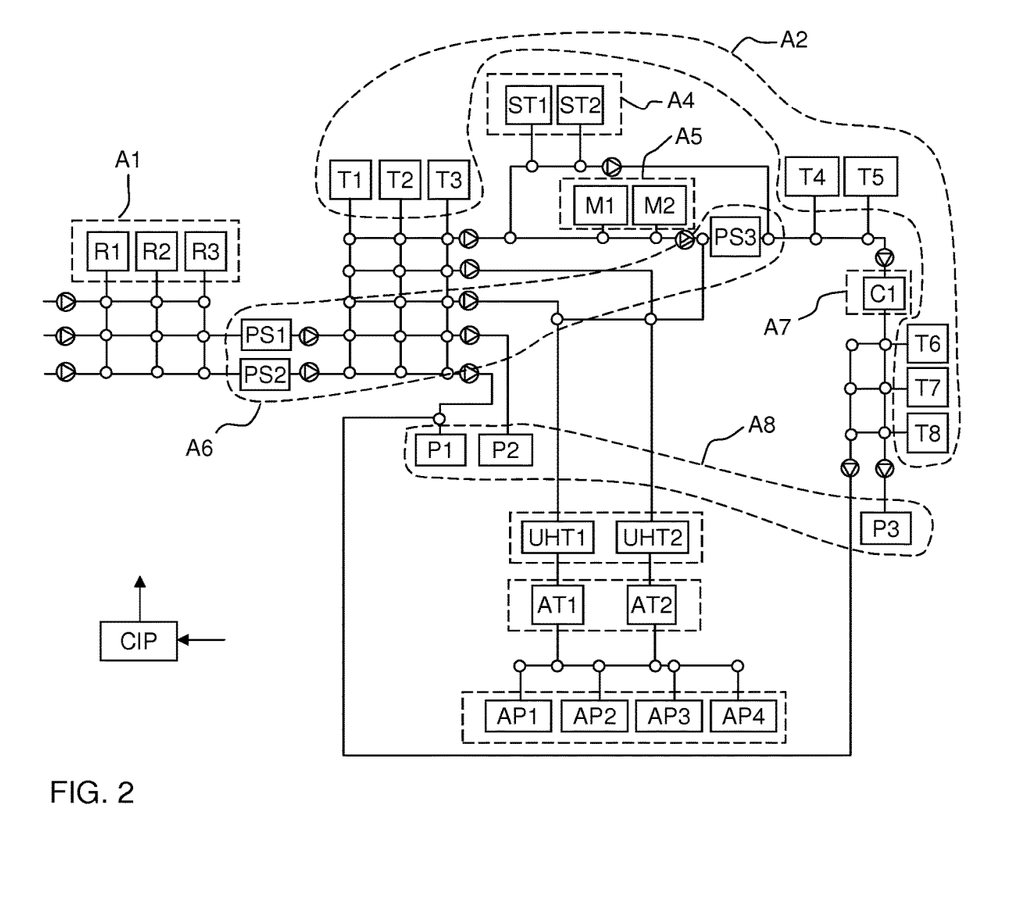
FIG. 2 is a block flow diagram of a production plant for packaged dairy products.

FIG. 2 shows a generalized example of a plant 10 for production of packaged dairy products. In FIG. 2, open squares represent production equipment, denoted "production units" or PUs in the following, and solid lines that extend between the PUs indicate fluid conduits (fluid paths). The fluid conduits may be permanently arranged to extend as shown, but it is also conceivable that fluid conduits may be added and/or moved by manual operations by the operating staff of the plant 10. The fluid conduits are schematically illustrated and each typically comprises multiple fluid paths that allow one or more fluids to pass simultaneously and separated from each other in opposite directions in the fluid conduit. Further, conventional pump symbols indicate provision of fluid pumps along the fluid conduits, and open circles indicate flow controlling valves. The PUs of the illustrated plant 10 include milk reception units R1-R3, which each may include a tank as well as equipment for further processing, such as pre-heating, de-aeration, homogenization, etc. Pasteurizers PS1-PS3 are arranged for heat treatment. Tanks T1-T8 are distributed throughout the plant 10 for storage of ingredients. intermediate products or final dairy products. Starter tanks ST1, ST2 are provided to contain and dispense a starter culture for use in production of fermented dairy products, such as yoghurt. Mixing devices M1, M2 are provided to enable admixing of dry or liquid ingredients, and a heat exchanger C1 is provided for cooling or heating. Filling machines or packaging lines P1-P3 are provided to fill dairy products into packages, e.g. of carton and/or plastic, which may be sealed for subsequent distribution. The plant 10 also comprises an aseptic (sterile) production section, which comprises units UHT1, UHT2 for ultra-high temperature processing, also known as ultra-heat treatment or ultra-pasteurization in the art, aseptic tanks AT1, AT2 for storage of sterilized dairy products, and aseptic filling machines or packaging lines AP1-AP4. All of the PUs shown in FIG. 2 are well-known to the skilled person, who also realizes that the plant 10 may comprise further PUs, including but not limited to separators, heaters, homogenizers, and package distribution equipment.

FIG. 2 also indicates that the plant 10 comprises a cleaning unit CIP, e.g. a conventional clean-in-place system which is connected for fluid communication with fluid conduits and/or PUs in the plant 10 to enable circulation of a cleaning fluid. The capability to clean the production equipment is a strict requirement in production of dairy products and is set by regulatory authorities. However, the need for cleaning may differ depending of the dairy product being produced, the time since last cleaning, etc. Generally, a plant 10 comprises one or only a few CIPs, and cleaning typically needs to be performed sequentially among the PUs and fluid conduits of the plant 10. Thus, the scheduling of the CIP(s) may have a significant impact on the duration of the production processes 20A-20C in the plant 10 (FIG. 1).

The dashed lines in FIG. 2 indicate an affiliation of the respective PU to functional groups, as will be described further below with reference to FIGS. 5 and 6B.

Figure 3A:
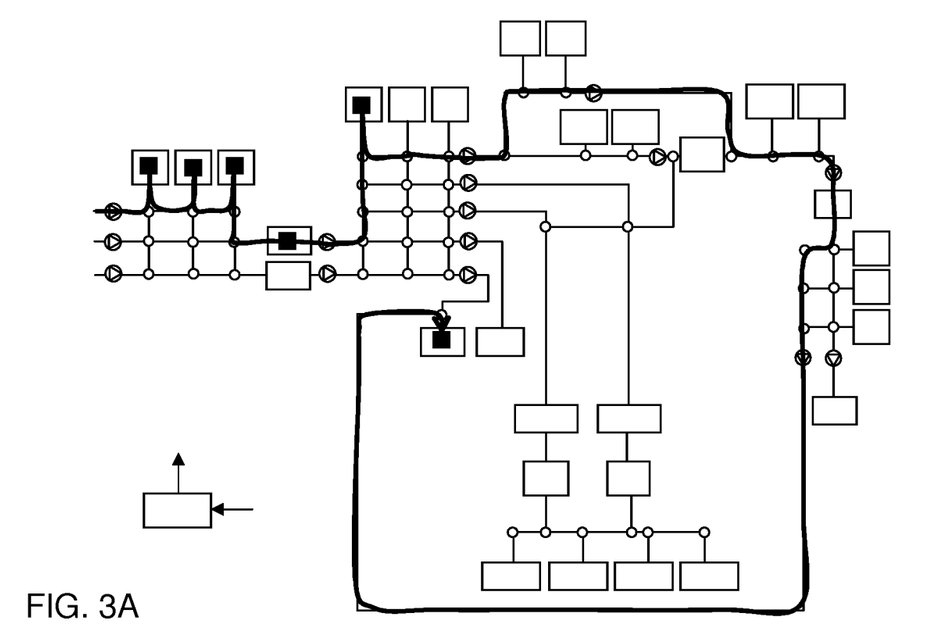
FIGS. 3A-3C illustrate material flows in the plant of FIG. 2 for production of packages of three different dairy products.
Figure 3B:
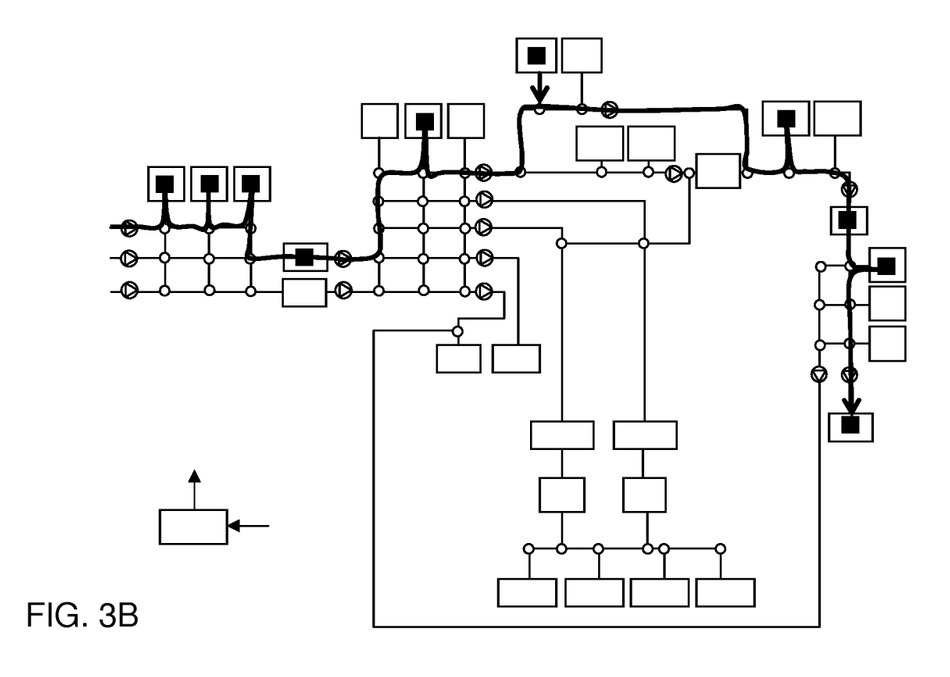
Figure 3C:
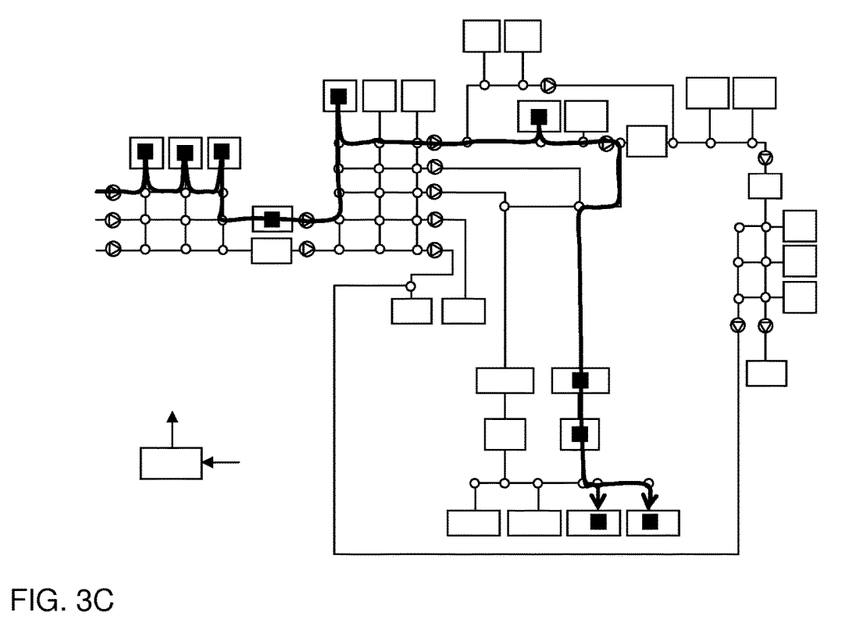

FIGS. 3A-3C show examples of how material may flow through the plant 10 of FIG. 2, where the thick arrow line indicates the material flow and the filled squares indicate the PUs that are operated for processing.

FIG. 3A illustrates the material flow for production of packaged standard milk. A delivery of raw milk is pumped into milk reception units R1-R3, whereupon the milk is subjected to heat treatment when pumped through the pasteurizer PS1 into storage tank T1. From tank T1, the treated milk is pumped to the filling machine P1 which is operated to produce packages of milk. The combination of PUs indicated by filled squares in FIG. 3A may be seen to perform the production process 20C in FIG. 1 to produce packages of milk 30C based on raw milk I1.

FIG. 3B illustrates the material flow for production of packaged yoghurt. A delivery of raw milk is pumped into milk reception units R1-R3, whereupon the milk is subjected to heat treatment when pumped through the pasteurizer PS1 into storage tank T2. From tank T2, the treated milk is pumped past the starter tank ST1 which is operated to add a starter culture to the milk. The mixture of milk and start culture is pumped into tank T4 for fermentation (incubation) during a predefined time period, whereupon the resulting yoghurt is cooled when pumped through the heat exchanger C1 into tank T6 for intermediate storage. From tank T6, the yoghurt is pumped to filling machine P3 which is operated to produce packages of yoghurt. The combination of PUs indicated by filled squares in FIG. 3B may be seen to perform the production process 20B in FIG. 1 to produce packages of yoghurt 30B based on raw milk I1 and starter culture I2.

FIG. 3C illustrates the material flow for production of chocolate milk in aseptic packages. A delivery of raw milk is pumped into milk reception units R1-R3, whereupon the milk is subjected to heat treatment when pumped through the pasteurizer PS1 into storage tank T1. From tank T1, the treated milk is pumped through the mixing unit M1 which is operated to mix chocolate powder and sugar into the milk. The resulting chocolate milk is pumped through the aseptic heat treatment unit UHT2 and into aseptic tank AP2 for intermediate storage. From aseptic tank AP2, the sterilized chocolate milk is pumped to aseptic filling machines AP3, AP4 which are operated in parallel to produce sterile packages of chocolate milk. The combination of PUs indicated by filled squares in FIG. 3C may be seen to perform the production process 20A in FIG. 1 to produce packages of chocolate milk 30A based on raw milk I1, chocolate powder I2 and sugar I3.

Figure 4A:
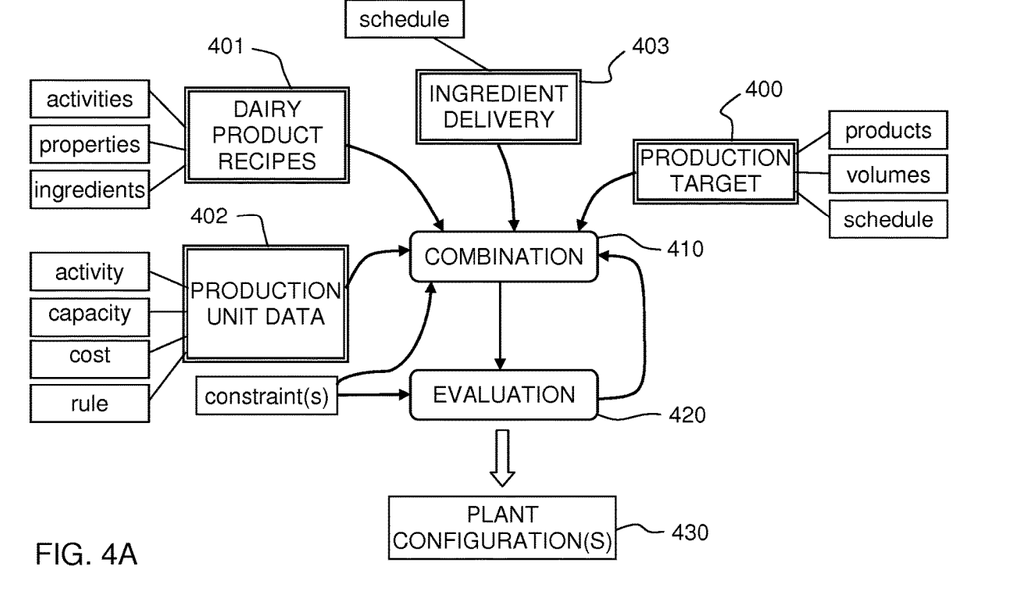
FIG. 4A is an overview of an embodiment of a method for dimensioning a plant for production of packaged dairy products.

FIG. 4A is an overview of an embodiment for dimensioning a new production plant, e.g. a plant 10 as shown in FIG. 2. As used herein, dimensioning designates the process of determining the outline of the plant, the included PUs, and the available fluid paths between the PUs. A dimensioning process may also be denoted an engineering design process, a simulation process or a configuration process. FIG. 4A may be seen to represent input data 400-403 for the dimensioning, blocks 410, 420 that are configured to perform a dimensioning process, and output data 430 that is generated by the dimensioning process.

The input data comprises target production data ("production target") 400 for the new plant. The production target 400 may specify the dairy product packages ("products") and the production volumes ("volumes") to be produced for a specific time period, e.g. one or more days or weeks, where the respective dairy product package may be defined by type of dairy product and type of package. Such a production target 400 is also known as an SKU list (Stock Keeping Unit) in the art. As indicated in FIG. 4A, the production target 400 may also include a production schedule ("schedule") for the dairy product packages, i.e. the amount to be produced of a specific packaged dairy product as a function of time. The input data further comprises recipes 401 for the dairy products to be produced. Each recipe defines a sequence of recipe activities ("activities"), a set of ingredients ("ingredients") and may also specify a property of one or more activities, e.g. a minimum and/or maximum duration, a temperature interval, a pressure, a pumping speed, etc. The input data further comprises production unit data 402 that specifies selectable PUs that may be included in the new plant. The production unit data 402 associates each selectable PU with one or more unit activities ("activity") and one or more production capacities ("capacity"), e.g. given as volume, volume flow rate, package production rate, etc. For example, a tank may be associated with one or more of a total capacity, a maximum filling rate and a maximum emptying rate. The unit activities are defined to correspond to the recipe activities, so that each recipe activity may be matched to one or more unit activities. As indicated in FIG. 4A, the production unit data 402 may also associate one or more rules ("rule") with a selectable PU. The rule(s) may be directed to the cleaning process and, e.g., specify one or more of: a duration of a short cleaning process ("Short CIP"), a duration of an extended cleaning process ("Full CIP"), the number of consecutive Short CIPs that are allowed before a Full CIP is required, a first time limit for non-use of a PU without need for cleaning (i.e. a CIP needs to be performed if the PU has not been used for a time period that exceeds the first time limit), a second time limit for use of a PU without need for cleaning (i.e. a CIP needs to be performed whenever the second time limit is exceeded), and a need to perform a CIP when usage of a PU ends. Alternatively or additionally, the rule(s) may be directed to other features of the PU. For example, a rule for a tank may specify a volume or fraction of the tank that needs to be filled before emptying of the tank may be started ("minimum volume before emptying"), a rule for a heat treatment unit may specify a maximum time that water may circulate through the unit ("circulation limit"), a rule for any PU may specify a nominal time required for an operator to set up the PU ("preparation event duration"), a rule for any PU may specify a nominal time required for daily care ("daily care duration"), etc. The input data may also comprise delivery data 403 for the ingredients, including a delivery schedule for the delivery of one or more ingredients. Such a delivery schedule may designate, as a function of time, the amount of a specific ingredient that will be delivered and needs to be handled at the plant.

As indicated in FIG. 4A, a combination block 410 is arranged to process the input data 400-403 so as to generate combinations of selectable PUs that are connected for fluid communication and are operable to perform the sequence of recipe activities of the respective recipe 401. An evaluation block 420 is arranged to evaluate the combinations generated by block 410. As indicated in FIG. 4A, the combination and evaluation blocks 410, 420 may implement an iterative optimization process, where the evaluation block 420 provides information about the outcome of the evaluation to the combination block 410, thereby enabling the combination block 410 to systematically generate combinations of selectable PUs for the purpose of reducing the time for the evaluation block 420 to find one or more acceptable combinations. Such an iterative optimization process may be based on any suitable optimization model. Examples of the dimensioning process performed by blocks 410, 420 are given further below with reference to FIGS. 6A-6B.

The output data of the dimensioning process is one or more proposed combinations of selectable PUs for the plant ("plant configuration"). As will be explained in more detail further below, the output data may also include one or more proposed time schedules for the respective proposed combination, where each proposed time schedule includes a time allocation of the selectable PUs in the proposed combination, or a subset thereof, to implement the respective production process (cf. 20A-20C in FIG. 1) so as to achieve the production target 400, where the production process is given by the recipes 401. The proposed combination(s) and/or the proposed time schedule(s) may be presented to a user, e.g. a process engineer, for further assessment of relevance and feasibility. The output data may also include further production-related data, such as an investment cost for the proposed combination, a projected time to achieve the production target for the respective time schedule, a production cost for the respective time schedule, and a consumption of one or more utilities such as water, energy, steam (for heat treatment and/or cleaning), cleaning agent, cooling fluid, etc for the respective time schedule.

Figure 5:
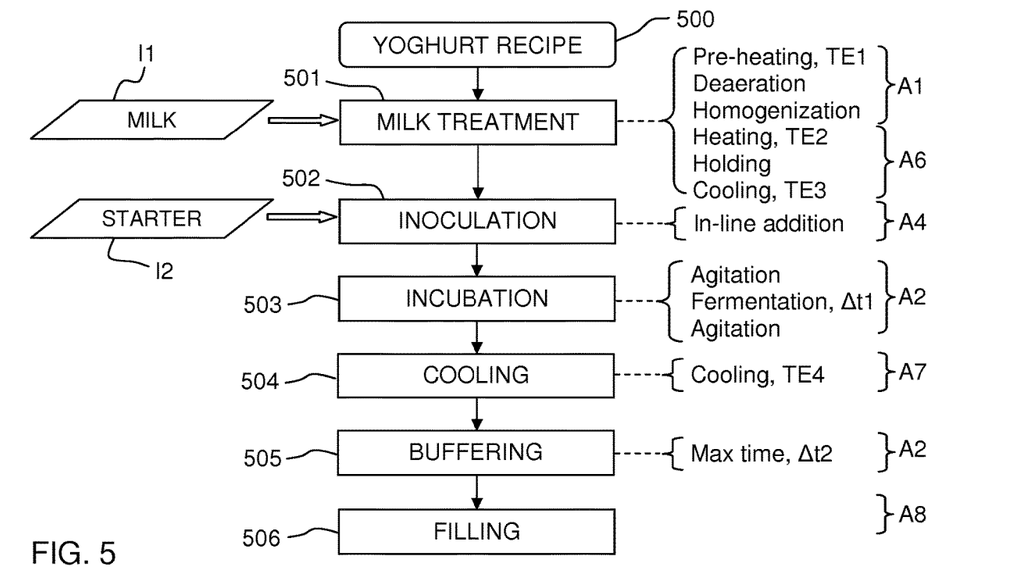
FIG. 5 shows a sequence of activities corresponding to a recipe for production of yoghurt.

FIG. 5 illustrates, in the form of a flow chart, an exemplifying recipe 500 for production of yoghurt. The illustrated recipe 500 comprises a sequence of processing steps 501-506 for producing yoghurt-containing packages. The recipe 500 also defines two ingredients, milk I1 and starter culture I2. Some processing steps are associated with specific properties, and some processing steps comprise a sequence of sub-steps, some of which are associated with specific properties. Specifically, the recipe 500 includes a milk treatment step 501, in which milk I1 is received and subjected to a treatment comprising a sequence of sub-steps: pre-heating, de-aeration, homogenization, heating, holding, and cooling. The sub-steps pre-heating, heating and cooling are associated with a respective property TE1, TE2, TE3 that indicates the temperature to be used in the respective sub-step. The milk treatment step 501 is followed by an inoculation step 502, in which the starter culture I2 is added to the milk by in-line addition. Then follows an incubation step 503, in which the mixture of milk and starter culture is subjected to agitation, fermentation, and agitation. The fermentation sub-step is associated with a property $\Delta t1$ that indicates its duration. A subsequent cooling step 504 reduces the temperature of the fermented mixture to TE4, and whereupon the resulting yoghurt is buffered 505 for a time period not to exceed $\Delta t2$. The recipe 500 is concluded by a step 506 of filling the yoghurt into packages. As indicated in FIG. 5, the recipe 500 may be generalized into a sequence of recipe activities, here A1, A6, A4, A2, A7, A2, A8, which are defined to correspond to activities ("unit activities") that may be performed by the selectable PUs.

Thus, each recipe may be structured into a set of ingredients and a sequence of recipe activities, where any of the recipe activities may be associated with one or more properties.

Figure 6A:
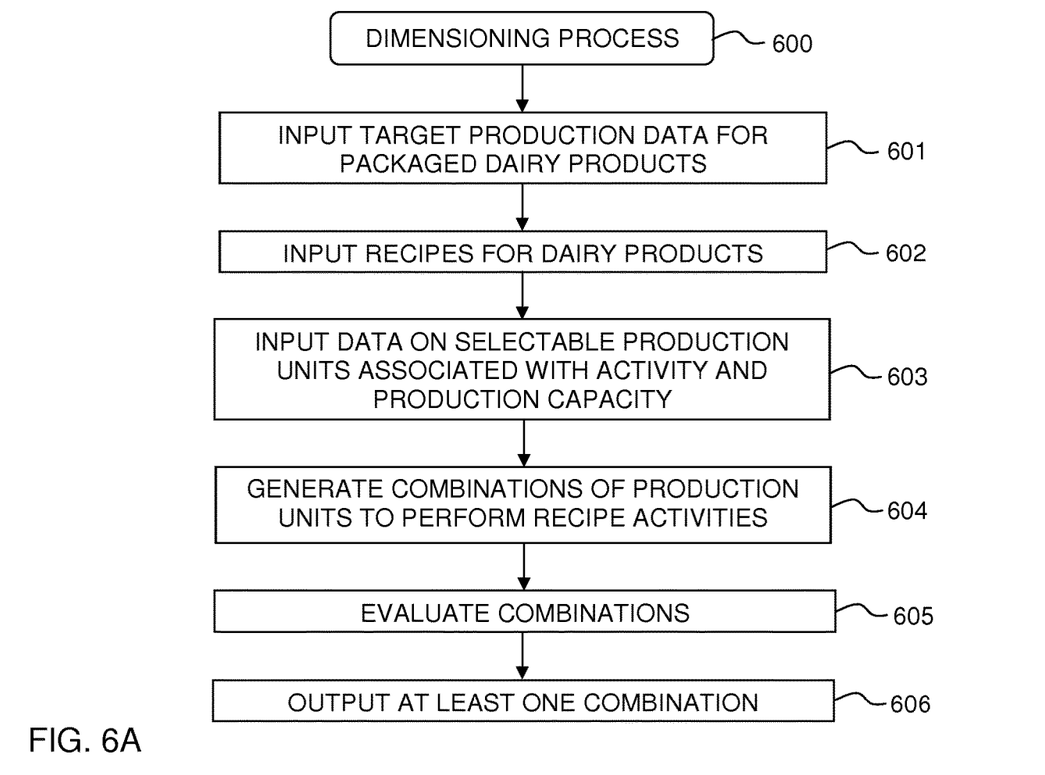
FIG. 6A is a flow chart of a dimensioning process in accordance with an embodiment.

FIG. 6A is a flow chart of a dimensioning process 600 according to an embodiment. The process 600 involves a set of data collection steps 601-603 for obtaining input data. Step 601 obtains the target production data (production target 400 in FIG. 4A) for a plurality of dairy products to be produced and packaged in the production plant, and step 602 obtains dairy product recipes (401 in FIG. 4A) for the dairy products to be produced according to the production target 400. Step 603 obtains the above-described production unit data (402 in FIG. 4A). Any one of steps 601-603 may involve instructing an operator, via a user interface (cf. 1006 in FIG. 10), to manually enter input data and/or select input data from a database. It is also conceivable that any one of steps 601-603 automatically retrieves input data from the database. For example, steps 602 and 603 may automatically retrieve recipes 401 from a database based on a production target 400 entered/selected by the operator, and automatically retrieve production unit data 402 based on the recipes 401.

The process 600 also comprises processing steps 604-605, which may be implemented by combination block 410 and evaluation 420 in FIG. 4A. Step 604 generates, as a function of the recipes 401 and the production unit data 402, candidate combinations of selectable PUs that are connected for fluid communication and are operable to perform the sequence of recipe activities of the respective recipe 401 to achieve the production target 400. Step 605 evaluates the candidate combination(s) for selection of at least one proposed combination (430 in FIG. 4A). Finally, step 606 outputs the proposed combination(s). Steps 604-606 may be seen to represent a simulation of the production of packaged dairy products in the production plant to determine at least one combination of selectable PUs that achieve the production target 400.

The dimensioning process 600, when implemented by a computer device, provides a simulation tool that enables a systematic analysis of various combinations of selectable PUs with respect to meeting a production target 400 and outputs one or more proposed combinations 430 that are capable of meeting or come sufficiently close to the production target 400. The tool will greatly facilitate the task of dimensioning a new production plant and may also result in significantly improved time scheduling, e.g. if steps 604-605 are implemented as an iterative optimization process which is configured to find the combination of selectable PUs that yield acceptable/optimal time schedule(s) subject to one or more evaluation constraints.

In one embodiment, step 604 identifies an available set of selectable PUs for performing the recipe activities by comparing the recipe activities of the recipes 401 to the unit activities of the selectable PUs of the production unit data 402. Step 604 may thereby include any selectable PU that is associated with a unit activity that matches a recipe activity in the available set. Step 604 may then allocate, based on the production capacity associated with the respective PU in the available set, a combination of PUs. To perform the allocation, step 604 may perform a backwards calculation of the required production capacity of the respective PU by a mass balance based on the products and volumes to be produced according to the production target 400, as well as the production schedule, if specified.

In one embodiment, step 605 generates, for each of the candidate combinations and as a function of the recipes 401 and the production unit data 402, one or more time schedules of recipe activities performed by the respective candidate combination to achieve the production target 400. If the production target 400 comprises a production schedule, step 605 may also account for the production schedule when generating the time schedule(s), by ensuring that the respective dairy product package is produced in correspondence with the production schedule. Further, the process 600 may include a step of obtaining an ingredient delivery schedule (403 in FIG. 4A), and step 605 may account for the ingredient delivery schedule 403 when generating the time schedule(s), by adapting the timing of recipe activities to the availability of ingredient(s).

Step 605 may further evaluate the candidate combinations based on the time schedule(s) generated for the respective candidate combination, and thereby select the proposed combination(s) 430 at least partly on the evaluation of the time schedules. More detailed examples of the evaluation in step 605 are given further below.

Figure 6B:
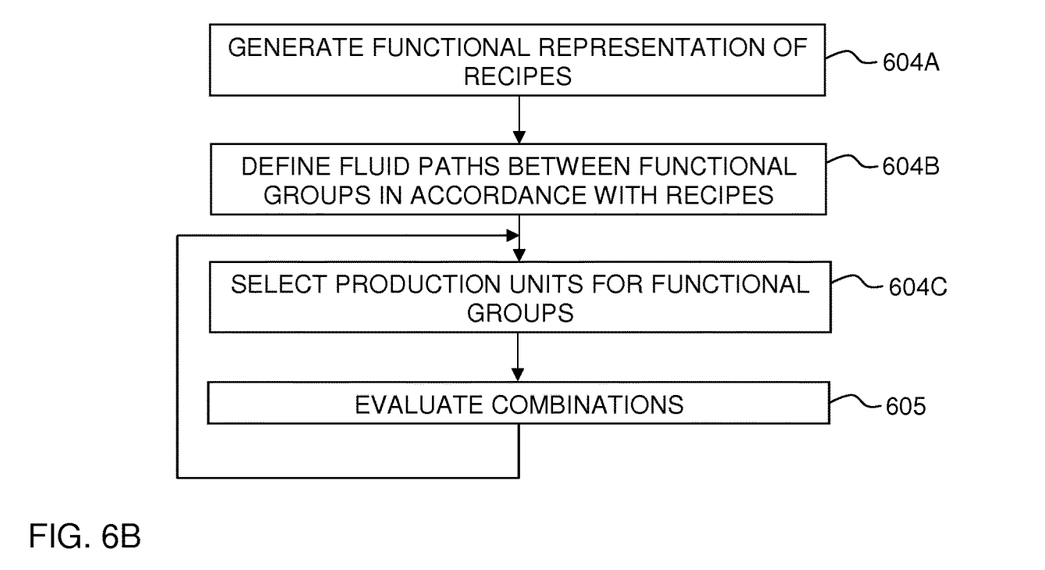
FIG. 6B is a flow chart of a part of a dimensioning process in accordance with a further embodiment.

FIG. 6B is a flow chart of steps 604-605 in FIG. 6A in accordance with a further embodiment. Steps 604A-604C correspond to step 604 in FIG. 6A. The embodiment in FIG. 6B presumes that the production unit data 402, obtained in step 603, associates each of the selectable PUs with one or more functional groups of PUs, denoted "functional groups" in the following. The functional groups may be predefined to correspond to a respective recipe activity. Specifically, all selectable PUs in a certain functional group are associated with the same unit activity. Conceptually, the functional groups may thus be seen to be associated with a respective unit activity.

Figure 4B:
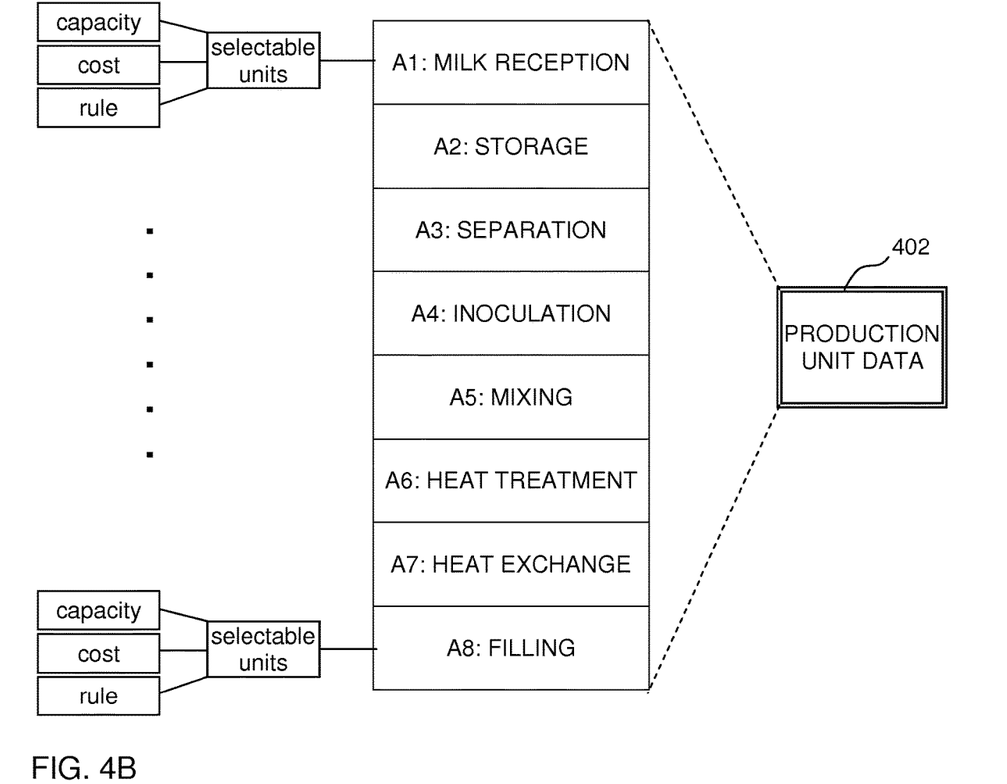
FIG. 4B illustrates an example of predefined functional groups that may be defined by input data in FIG. 4A.

A non-limiting example of production unit data 402 defining functional groups is shown in FIG. 4B. In this example, the functional groups include a milk reception group A1, a storage group A2, a separation group A3, an inoculation group A4, a mixing group A5, a heat treatment group A6, a heat exchange group A7 and a filling group A8. As indicated, each functional group A1-A8 may be associated with one or more selectable PUs ("selectable unit"). For example, the storage group A2 may be associated with different tanks, and the filling group A8 may be associated with different filling machines or packaging lines. As shown, each selectable PU may be associated with one or more capacities ("capacity"), a cost index ("cost"), and one or more rules ("rule"). It may be noted that the recipe activities in FIG. 5 correspond to the functional groups in FIG. 4B. For further illustration, the functional groups A1-A8 in FIG. 4B have been mapped to the plant 10 in FIG. 2, in which the dashed lines encircle the PU(s) that are associated with the respective functional group.

Reverting to FIG. 6B, step 604A generates a functional representation of the recipes 401 by representing each recipe activity in the recipes by a functional group. Specifically, step 604 may represent the respective recipe activity by its corresponding functional group. Step 604B defines fluid paths between the functional groups in the functional representation in accordance with the sequence of recipe activities of the respective recipe. Step 604C selects, for the respective functional group in the functional representation, one or more selectable PUs that are associated with the functional group, to thereby generate a candidate combination of selectable PUs that are connected for fluid communication and operable to perform the sequence of recipe activities of the recipes 401 to achieve the production target 400. Step 605 then evaluates the candidate combination generated by step 604C. It is conceivable that step 604C generates several different candidate combinations for subsequent evaluation by step 605. Alternatively, as indicated in FIG. 6B, steps 604C and step 605 may be repeatedly performed to generate and evaluate different candidate combinations. Specifically, the process returns to step 604C to select a new candidate combination of selectable PUs, based on the outcome of the evaluation in step 605. Thereby, step 604C may be adapted based on the outcome of the evaluation of one or more previous candidate combinations. This iterative approach allows the dimensioning process 600 to systematically search for acceptable/optimal combinations. Such an iterative approach may also be implemented in the embodiment of FIG. 6A.

The use of functional groups in accordance with FIG. 6B provides a structured way of selecting PUs for implementation of a plurality of recipes and works especially well in combination with the above-mentioned iterative approach. For example, step 604C may generate the different candidate combinations by changing the selection of PUs for one or more functional groups in the functional representation, e.g. by changing the number of selected PUs and/or by replacing a previously selected PU by another PU with a different production capacity.

The embodiments in FIGS. 6A-6B may be modified to allow the user in step 603, e.g. on a user interface, to review the production unit data 402 and remove one or more of the selectable PUs before the method proceeds to step 604. In a further variant, the dimensioning method 600 allows the user to pre-assign a specific selectable PU to a particular recipe activity in a particular recipe, or to limit the selectable PUs that may be assigned to a particular recipe activity in a particular recipe. In these variants, the user may thus impose restrictions on the selectable PUs that may be included in the combinations that are generated by step 604. The dimensioning method 600 thereby allows the user to test the impact of different modifications to gain a better understanding of how the new plant may be dimensioned.

It is conceivable to further modify the dimensioning process 600 so as to account for the investment cost of the new plant. As understood from FIGS. 4A-4B, the production unit data 402 may associate each selectable PU with a cost index. The dimensioning process 600 may be modified to compute, for each of the candidate combinations generated by step 604/6040, an investment cost index as a function of the cost index for the selectable PUs that are included in the respective candidate combination. In one embodiment, step 605 may generate the candidate combinations so that their investment cost index is below a threshold, which may be predefined or entered by the user. The threshold may thus be a constraint for step 604/6040 (cf. constraint supplied to block 410 in FIG. 4A). Alternatively, the threshold may be a constraint for step 605 (cf. constraint supplied to combination block 420 in FIG. 4A). For example, step 605 may evaluate the candidate combinations based on their investment cost index and discard any candidate combination with an investment cost index that exceeds the threshold. Generally, as noted above, the investment cost index for the proposed combination(s) 430 may be output by step 606.

As described above, step 605 may generate and evaluate one or more time schedules for the respective candidate combination from step 604/6040. For example, step 605 may determine a plurality of candidate time schedules for each candidate combination, determine (if possible) an acceptable or optimal time schedule for each candidate combination (according to any criterion), and select the proposed combination(s) 430 based on the thus-determined acceptable/optimal time schedules. It is also conceivable that step 605 generates the time schedules for the respective candidate combination in an iterative optimization process, similar to the iterative process described for FIG. 6B. Thus, the outcome of the evaluation of one time schedule may be used for generating a subsequent time schedule, thereby enabling step 605 to systematically generate time schedules for the purpose of reducing the time to find an acceptable/optimal time schedule for each candidate combination, if possible.

In one embodiment, step 605 accounts for the need for cleaning of PUs and/or fluid conduits when generating the time schedules. As noted above, intermittent cleaning is mandatory in plants for production of dairy products and access to a cleaning unit (CIP) is often a bottleneck for the time scheduling. The dimensioning process 600 may thus include steps of defining fluid paths between at least one cleaning unit in the production plant and the selectable PUs in each candidate combination, and obtain rules for cleaning the respective selectable PU, e.g. given by the production unit data 402 (FIG. 4A). Thereby, step 605 may generate the time schedules as a function of the rules for cleaning. Examples of such rules for cleaning have been given hereinabove.

In one embodiment, step 605 may evaluate the time schedules for fulfillment of at least one evaluation constraint (cf. constraint supplied to block 420 in FIG. 4A). The evaluation constraint(s) may be obtained as part of the data collection steps 601-603 or may be predefined and stored in a memory (cf. 1003 in FIG. 10). In one embodiment, the evaluation constraint defines at least one of a maximum production time required to achieve the production target, a maximum production cost and a maximum labor cost. Step 605 may thus compute a parameter value representing any of the evaluation constraints for the respective time schedule and compare the parameter value to the evaluation constraint. If the production time and/or production cost and/or labor cost exceeds the evaluation constraint, step 605 may discard the time schedule. The labor cost may be computed based on the amount of manual labor required to set up the selected PUs and/or rearrange fluid conduits during the course of the time schedule. The production cost may be computed to represent the consumption of at least one utility during the course of the time schedule, including one or more of water, energy, steam, cooling fluid, and cleaning agent.

Step 605 may also perform a forward calculation for the time schedules, or at least the time schedules that are found to fulfill the evaluation constraint, to verify that the production target indeed is met, given the ingredients and the delivery schedule, if specified.

Generally, step 605 is performed to find, for each candidate combination, one or more time schedules with high time utilization of the PUs in the plant, few and/or short idle periods, few product changes and few and/or short cleaning activities.

The acceptable/optimal time schedule for the proposed combination(s) 430 may be output by step 606. In addition, step 606 may output further metrics computed for each such time schedule, such as total production time, CIP utilization, a graphical representation of bottlenecks, production cost, labor cost, etc.

Figure 7A:
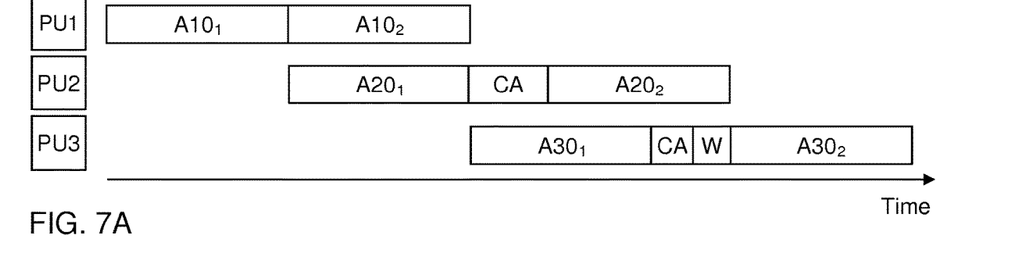
FIGS. 7A-7B illustrate changes in time schedules depending on the order of material supply to production units.
Figure 7B:
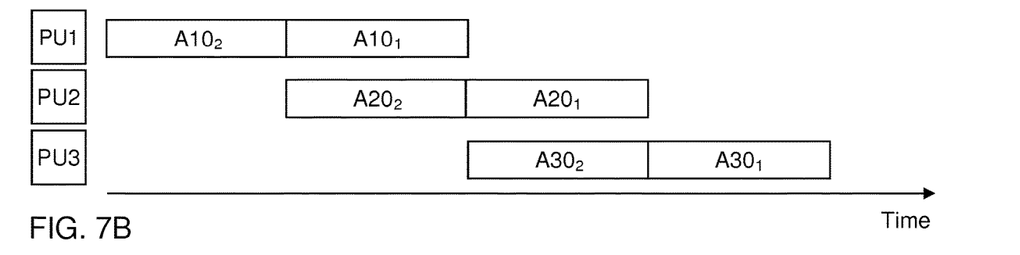

Generally, step 605 may take into account rules included in the production unit data 402 when generating the time schedules. To give an example, consider a cleaning rule that stipulates that a PU must be cleaned after each handling of a certain dairy product or intermediate product, unless the same dairy product or intermediate product is handled next, and that the PU otherwise is to be cleaned in accordance with a default cleaning rule (e.g. Short CIP and/or Full CIP as described above). FIGS. 7A-7B illustrate the timing of recipe activities A10, A20, A30 performed by three production units PU1, PU2, PU3 for production of first and second (different) dairy products. Recipe activities performed for production of the first and second dairy products are distinguished by subscript 1 and 2, respectively. The first dairy product may be yoghurt and the second dairy product may be standard milk. In the illustrated example, the production units PU2, PU3 are associated with a cleaning rule that mandates cleaning after each completed recipe activity for production of the first dairy product, whereas no such cleaning rule is defined for production of the second dairy product. FIG. 7A shows the sequence of recipe activities when the first dairy product is handled before the second dairy product in the respective production unit PU1-PU3. As seen, PU2 and PU3 need to be subjected to a cleaning activity, indicated by CA. Further, PU3 will have an idle or waiting period, indicated by W in FIG. 8A, while waiting for the handling of the second dairy product in PU2 to be completed. FIG. 7B shows the timing of recipe activities when the second dairy product is handled before the first dairy product. Clearly, the absence of cleaning activities enables a better utilization of the production units PU1-PU3 and also reduces the utilization of the cleaning unit(s) in the plant.

As understood from FIGS. 7A-7B, step 605 may generate different time schedules for a candidate combination by varying the order of supplying dairy products, or corresponding intermediate products, to one or more PUs.

Figure 8A:
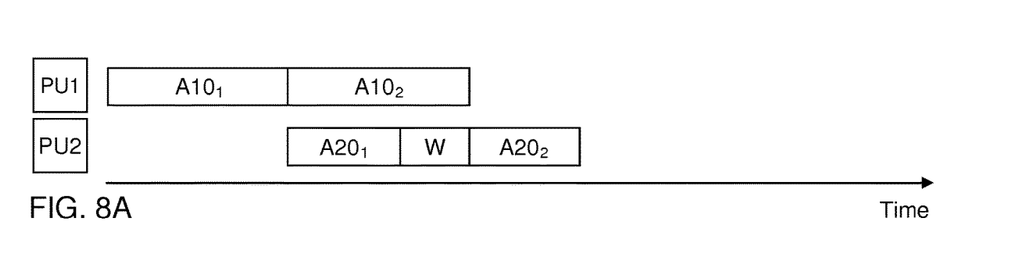
FIGS. 8A-8C illustrate changes in time schedules depending on production capacity and number of production units.
Figure 8B:
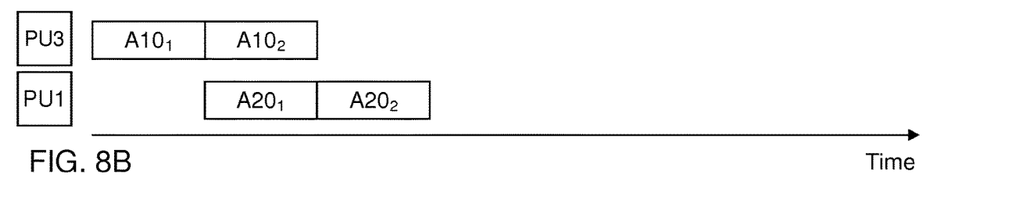
Figure 8C:
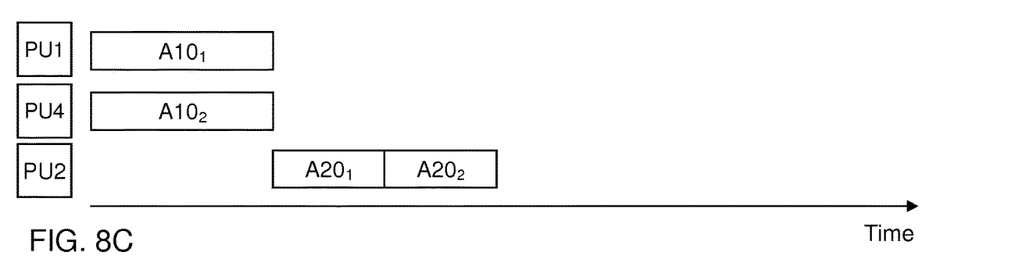

FIG. 8A illustrates the timing of recipe activities A10, A20 performed by two production units PU1, PU2 for production of first and second dairy products. As seen, PU2 will have an idle period, indicated by W, while waiting for the handling of the second dairy product in PU1 to be completed. In FIG. 8B, PU1 has been replaced by PU3, which is capable of performing the same recipe activity (A10) but has a higher production capacity than PU1. Thereby, the idle period W is eliminated. In FIG. 8C, PU1 of FIG. 8A has been supplemented by PU4, which is capable of performing the same recipe activity (A10) and has the same production capacity as PU1. As seen, PU4 allows for parallel handling of the first and second dairy products, and the idle period W is eliminated.

As understood from FIGS. 8A-8C, the acceptable/optimal time schedules determined by step 605 may differ significantly between candidate combinations. It is also realized that the iterative approach in FIG. 6B may be quite effective in that step 604/6040 be controlled to selectively change the content of a previous candidate combination, e.g. by changing the number of selectable PUs associated with a unit activity and/or by replacing a selectable PU associated with a unit activity by another selectable PU associated with the same unit activity but having a different production capacity.

It is also conceivable that step 604/6040 adds one or more selectable PUs (tanks) for intermediate storage, even if such intermediate storage is not included in the recipe, e.g. to enable continuous processing in a downstream PU or sharing of fluid conduits and PUs between recipes. An example is seen by comparing the yoghurt recipe 500 in FIG. 5 to the material flow in FIG. 3B, where the treated milk is stored temporarily in tank T2.

Figure 9:
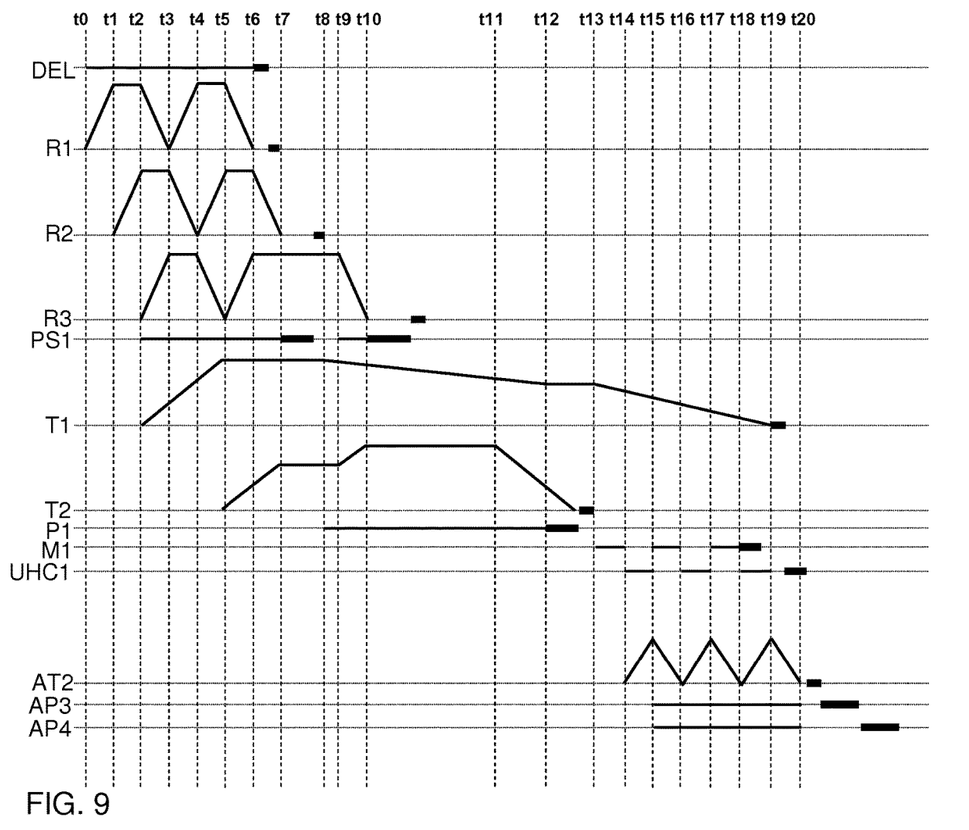
FIG. 9 is an example of a proposed time schedule generated for the production plant in FIG. 2.

FIG. 9 shows, in the form of a Gantt chart, a part of a time schedule that has been generated and output by the dimensioning process 600 for production of packages containing standard milk, yoghurt and chocolate milk (as well as other packaged dairy products) for a proposed combination 430 corresponding to the plant 10 in FIG. 2. The material flows in FIGS. 3A-3C corresponds to the time schedule of FIG. 9. Thin lines indicate periods of utilization of PUs, and thick lines indicate cleaning activities. Further, for tanks, the thin lines are drawn to represent the change in fluid volume inside the respective tank over time. The dashed vertical lines, corresponding to time points t0-t20, are merely provided to facilitate understanding of the Gantt chart by indicating start and end of various activities. As seen, the time schedule is produced to synchronize activities within the plant. It is also seen that the cleaning activities do not overlap, since there is only one CIP in the plant. At the top of FIG. 9, DEL designates a time period when milk is delivered to the plant. The illustrated part of the time schedule mainly represents the production of standard milk and chocolate milk in accordance with FIGS. 3A and 3C, although the filling and emptying of tank T2 is part of the production of yoghurt in accordance with FIG. 3B.

Figure 10:
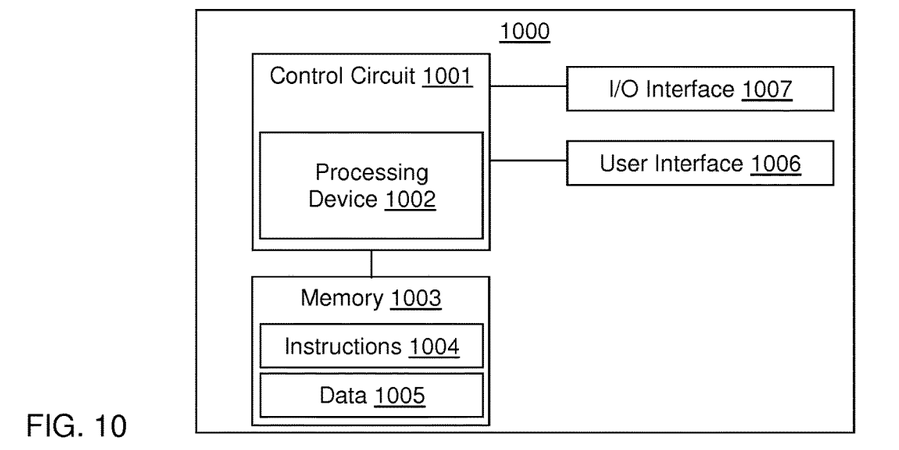
FIG. 10 is a block diagram of a device for performing dimensioning processes in accordance with embodiments of the invention.

FIG. 10 is a block diagram of an example structure of a computer device 1000 for performing a dimensioning process in accordance with any of the embodiments and variants described in the foregoing. In the illustrated example, the device 1000 comprises a control circuit or control unit 1001 and a memory 1003. The control circuit 1001 is responsible for the overall operation of the device 1000 and may comprise any commercially available processing device 1002, such as a CPU ("Central Processing Unit"), DSP ("Digital Signal Processor"), microprocessor or other electronic programmable logic device, or combination thereof. The control circuit 1001 may be implemented using instructions that enable hardware functionality, e.g. executable computer program instructions 1004 that may be stored on the memory 1003. The processing device 1002 may be configured to read the instructions 1004 from the memory 1002 and execute these instructions to control the operation of the device 1000, e.g. to perform any of the methods described herein. The program instructions 1004 may be provided to the device 1000 on a computer-readable medium, which may be a tangible (non-transitory) product (e.g. magnetic medium, optical disk, read-only memory, flash memory, etc) or a transitory product, such as a propagating signal.

The memory 1003 may be, for example, one or more of a buffer, a flash memory, a hard drive, a removable media, a volatile memory, a non-volatile memory, a random access memory (RAM), or other suitable device. In a typical arrangement, the memory 1003 includes a non-volatile memory for long term data storage and a volatile memory that functions as system memory for the control circuit 1001. As indicated in FIG. 10, the memory 1003 may also store data 1005 for use by the control circuit 1001, e.g. recipes 401, production unit data 402, etc. The memory 1003 may exchange data with the control circuit 1001 over a data bus. Accompanying control lines and an address bus between the memory 1003 and the control circuit 1001 may also be present. In a variant, the memory 1003 is at least partly located within the control circuit 1001.

The device 1000 further comprises a user interface (UI) 1006 for providing information or instructions to a user and/or receiving instructions from the user. For example, device 1000 may present the proposed combination(s) 430, proposed time schedule(s) for the proposed combination(s) 430, and any associated metrics, to the user via the UI 1006. The device 1000 may also obtain input data from the user via the UI 1006, e.g. as part of any one of steps 601-603. The UI 1006 may e.g. include a display, button(s), a keypad, a touchpad, a touch panel, indicator lamp(s), a microphone, a speaker, etc, or any combination thereof.

In the illustrated example, the device 1000 further comprises one or more communication interfaces 1007 for operatively connecting the device 1000 to an external device by wire or wirelessly, such as over a network. In one example, the device 1000 may retrieve data from the external device, e.g. recipes 401, production unit data 402, etc. In another example, the device 1000 may transmit the proposed combination(s) 430 and other output data to the external device.

The invention claimed is:

1. A computer-implemented method of dimensioning a plant for production of packaged dairy products, said method comprising:
    obtaining a target production data for a plurality of dairy products to be produced and packaged in the plant to form the packaged dairy products, the dairy products comprising at least a yoghurt;
    obtaining a plurality of recipes for production of the plurality of dairy products, wherein each recipe defines a set of ingredients and a sequence of recipe activities for producing a respective dairy product from the set of ingredients, wherein the set of ingredients for the yoghurt comprises milk and starter culture and the sequence of recipe activities for the yoghurt comprises heat treatment of the milk, inoculation of the starter culture into the milk, incubation of the ingredients to produce the yoghurt, and packaging of the yoghurt;
    obtaining production unit data for selectable production units comprising at least a tank and one or more cleaning units (CIP), the production unit data associating each selectable production unit with one or more production unit activities associated with the sequence of recipe activities and a production capacity, the production unit data associating each selectable production units with one or more rules comprising at least one cleaning rule associated with a cleaning process of the selectable production units by the cleaning unit, wherein the cleaning process comprises a short cleaning process and an extended cleaning process, and wherein at least one of the cleaning rules is associated with a duration of the cleaning process;
    simulating the production of the packaged dairy products in the plant to determine at least one combination of the selectable production units that achieves the target production data, said simulating comprising:
        generating, as a function of the plurality of recipes and the production unit data, combinations of the selectable production units that are connected for fluid communication and operable to perform the sequence of recipe activities of each of the respective recipe, a non-recipe activity that is not included in the sequence of recipe activities of the plurality of recipes, and the one or more rules to achieve the target production data, the non-recipe activity comprising intermediate storage in the tank of an intermediate product of the set of ingredients after undergoing at least one of the recipe activities;
        evaluating the combinations of the selectable production units for selection of said at least one combination and at least one time schedule performed by the selected at least one combination to achieve the target production data; and
        outputting the selected at least one combination and the selected at least one time schedule performed by the selected at least one combination, wherein the combinations of the selectable production units are generated and evaluated iteratively as part of an optimization process that comprises:
            repeatedly selecting and evaluating a candidate combination among the combinations of the selectable production units, the selection of the candidate combination being based on an outcome of evaluating one or more previous candidate combinations,
            repeatedly generating, for the candidate combination and as a function of the recipes, the non-recipe activity, and the one or more rules for production of the plurality of dairy products and the production unit data, time schedules performed by the candidate combination to achieve the target production data, and
            evaluating the time schedules for fulfillment of at least one evaluation constraint, the at least one evaluation constraint at least partially defined by minimizing an amount of time spent cleaning by the one or more cleaning units; and
    allocating the at least one combination of the selectable production units determined from the simulation as dimensions for building the plant and operating the plant built with the dimensions to produce the packaged dairy products comprising a packaged yogurt by operating each of the selectable production units within the at least one combination of the selectable production units within a respective start time and a respective end time in accordance with the at least one time schedule to achieve the target production data.

2. The computer-implemented method of claim 1, wherein each selectable production unit is associated with a cost index, and wherein the method further comprises: computing for each of the combinations, an investment cost index as a function of the cost index for the selectable production units that are included in the respective combination.

3. The computer-implemented method of claim 2, wherein the combinations are generated so that the investment cost index is below a threshold.

4. The computer-implemented method of claim 1, wherein said generating comprises:
comparing the sequence of recipe activities to the one or more production unit activities to identify a set of selectable production units for performing the recipe activities; and
allocating, based on the production capacity of the set of selectable production units, a combination of selectable production units among the set of selectable production units to perform the sequence of recipe activities of the respective recipe to achieve the target production data.

5. The computer-implemented method of claim 1, wherein the production unit data defines functional groups and associates each of the functional groups with a respective unit activity and a respective subset of the selectable production units, wherein said generating comprises:
generating a functional representation of said plurality of recipes by representing each recipe activity in said plurality of recipes by a functional group; defining fluid paths between the functional groups in the functional representation in accordance with the sequence of recipe activities of the respective recipe; and
generating the combinations by selecting, for the respective functional group in the functional representation, one or more of the selectable production units associated with the respective functional group.

6. The computer-implemented method of claim 5, wherein the combinations differ by at least one of: a production capacity of at least one selectable production unit in at least one of the functional groups, or a count of the selectable production units in at least one of the functional groups.

7. The computer-implemented method of claim 5, further comprising, prior to simulating the production of the packaged dairy product, receiving a user input for at least one of increasing an amount of or replacing at least one previously selected selectable production unit of the functional group associated with the sequence of recipe activities, the at least one previously selected selectable production unit used to generate at least one of the combinations of the selectable production units.

8. The computer-implemented method of claim 1, wherein the candidate combinations are evaluated based on the time schedules generated for each of the candidate combinations, and wherein the outcome of the evaluating of a time schedule is used for generating a subsequent time schedule.

9. The computer-implemented method of claim 8, wherein the optimization process further comprises:
obtaining the at least one evaluation constraint, wherein the time schedules that are generated for each of the candidate combinations are compared, when the candidate combinations are evaluated, to the at least one evaluation constraint.

10. The computer-implemented method of claim 9, wherein the at least one evaluation constraint defines at least one of: a time required to achieve the target production data, a production cost or a labor cost.

11. The computer-implemented method of claim 10, wherein the production cost is represented by consumption of at least one utility, including one or more of water, energy, steam, cooling fluid or cleaning agent.

12. The computer-implemented method of claim 1, further comprising:
obtaining a delivery schedule of the set of ingredients, wherein the time schedules are further generated as a function of the delivery schedule of the set of ingredients.

13. The computer-implemented method of claim 1, further comprising:
obtaining a production schedule of the packaged dairy products, wherein the time schedules are further generated as a function of the production schedule of the packaged dairy products.

14. The computer-implemented method of claim 1, wherein the selectable production units further comprise at least one or more of a mixer, a filling machine, a package distribution equipment, a packaging line, a separator, a homogenizer, a heat treatment unit, or a heat exchanger.

15. The computer-implemented method of claim 14, wherein the one or more rules further comprises at least one of minimum volume before emptying of the tank, a circulation limit of the heat treatment unit, or a preparation event duration of at least one of the selectable production units.

16. The computer-implemented method of claim 1, wherein the generating the combinations of selectable production units comprises:
performing a backwards calculation of required production capacity of the selectable production units by a mass balance based on the target production data, and
allocating the combinations of selectable production units based on the production capacity of each selectable production unit in relation to the required production capacity.

17. The computer-implemented method of claim 1, wherein the sequence of recipe activities comprises a sequence of sub-steps associated with each of the sequence of recipe activities comprising of at least one of pre-heating, de-aeration, homogenization, heating, holding, cooling, agitation, or fermentation.

18. The computer-implemented method of claim 1, further comprising:
receiving a user input for adding or removing at least one specific selectable production unit from the simulated at least one combination of the selectable production units determined from the simulation,
re-simulating the production of the packaged dairy products in the plant with the adding or removing of the at least one specific selectable production unit to determine a re-simulated at least one combination of the selectable production units that achieves the target production data, and
comparing the simulated at least one combination and the re-simulated at least one combination.

19. The computer-implemented method of claim 1, wherein at least one of the cleaning rules is associated with a maximum number of the short cleaning processes for a particular selectable production unit that is permitted before requiring the extended cleaning process.

20. The computer-implemented method of claim 1, wherein at least one of the cleaning rules is associated with at least one threshold time for a particular selectable production unit and in response to exceeding the at least one threshold time, requires the cleaning process of the particular selectable production unit.

21. The computer-implemented method of claim 1, wherein at least one of the cleaning rules comprises requiring the cleaning process in response to the selectable production unit handling a particular type of ingredient or intermediate product unless scheduled to subsequently handle the particular type of ingredient or intermediate product.

22. A non-transitory computer-readable medium storing computer instructions which, when executed by a processing device, cause the processing device to perform the computer-implemented method of claim 1.

* * * * *